May 8, 1951 G. W. ELVERUM 2,552,037
HIGH-SPEED PULVERIZER
Filed Dec. 1, 1945 2 Sheets-Sheet 1
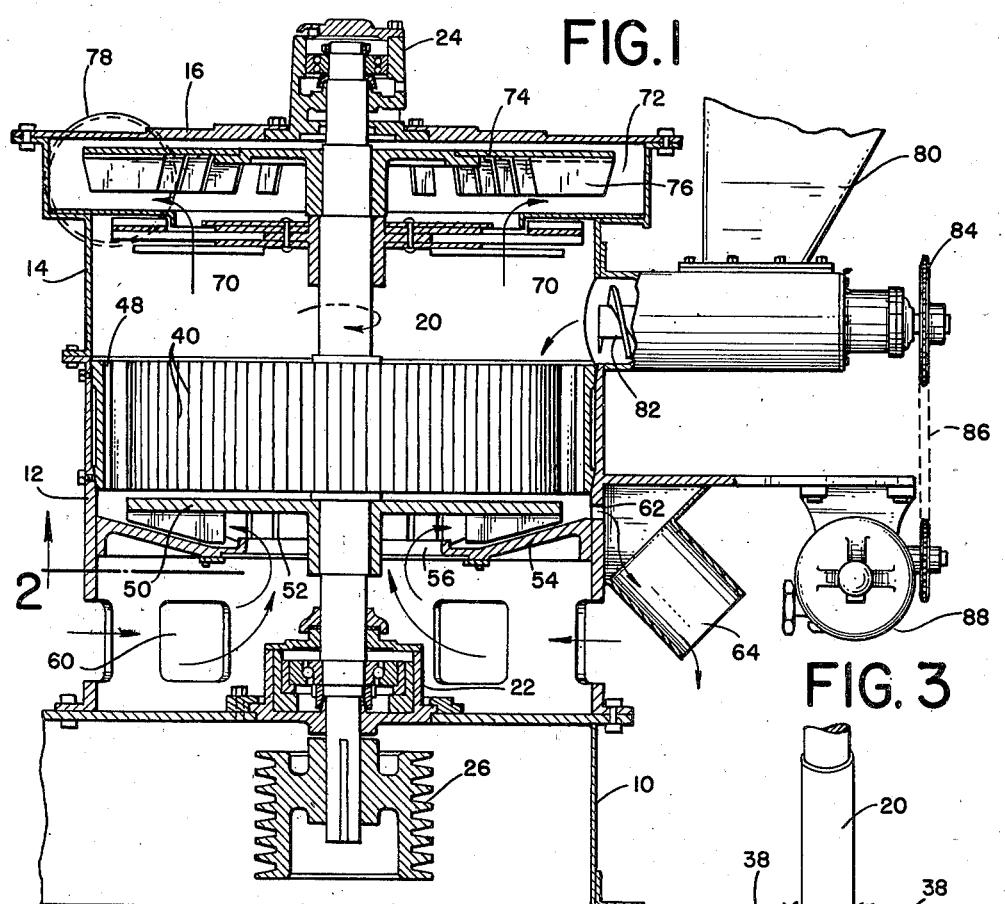
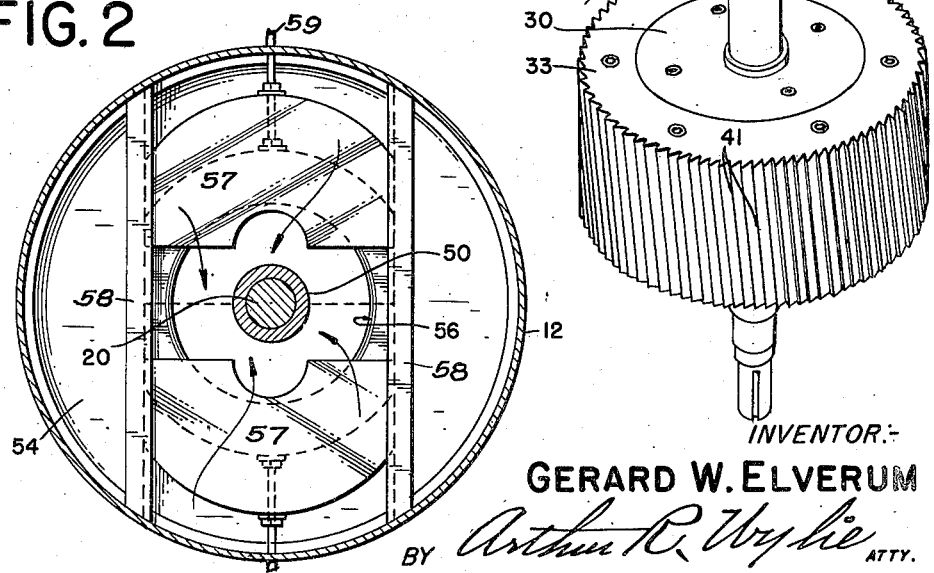
INVENTOR:-
GERARD W. ELVERUM
BY Arthur R. Wylie ATTY.

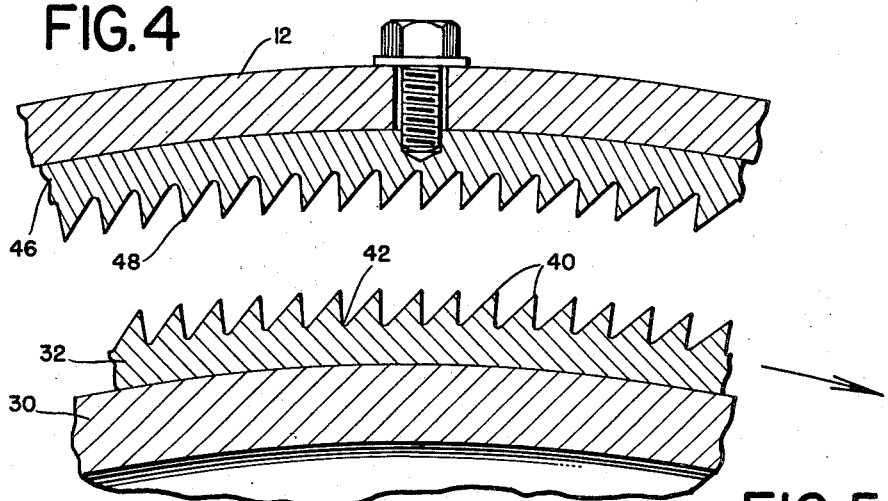
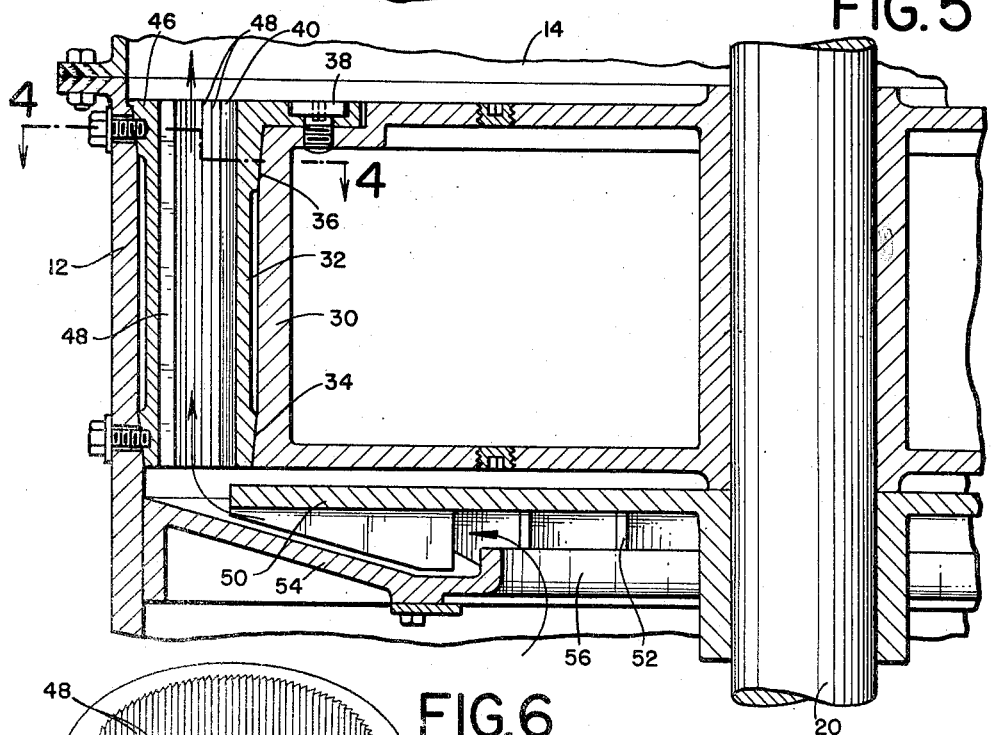
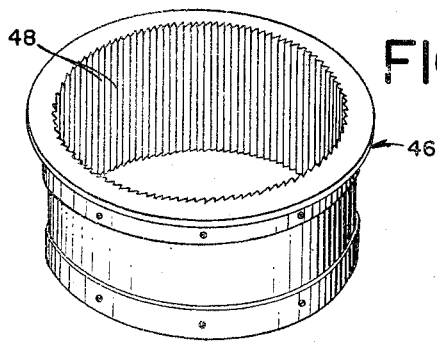

Patented May 8, 1951

2,552,037

UNITED STATES PATENT OFFICE 2,552,037

HIGH-SPEED PULVERIZER

Gerard W. Elverum, Minneapolis, Minn., assignor to General Mills, Inc., a corporation of Delaware Application December 1, 1945, Serial No. 632,209

3 Claims. (Cl. 241—56)

This invention relates to pulverizers and more particularly to those for milling or pulverizing guar, tara, and similar leguminous seeds, or any other vegetable or other material difficult to pulverize.

An object of the invention is the provision of an improved means for pulverizing various substances such as the above-mentioned seeds.

This and other objects as will hereinafter appear are accomplished by this invention which is fully described in the following specification and shown in the accompanying drawings in which Figure 1 is a vertical section to a machine embodying the invention;

Fig. 2 is a partial enlarged section on the line 2 of Fig. 1;

Fig. 3 is a perspective of a modified form of the rotor and the shaft on which it is mounted;

Fig. 4 is a partial enlarged section on the line 4—4 of Fig. 5;

Fig. 5 is a partial enlarged vertical section through the rotor and stator on substantially the same line as that on which Fig. 1 is taken; and Fig. 6 is a perspective view of the stator.

The embodiment illustrated comprises a pulverizer, which as a whole is best illustrated in Fig. 1, having a hollow base 10 on which is bolted a lower housing 12 and above that an upper housing 14, and cover 16.

A vertical shaft 20 is suitably journalled in ball bearings inclosed within lower and upper housings 22 and 24 which are suitably secured to the base 10 and the cover 16 respectively. This shaft has a sheave 26 keyed thereon at its lower end, the latter being driven by a V-belt not shown from any suitable source of power.

A rotor drum 30 is secured to the shaft intermediate its length and carries a rotor face 32 (Fig. 5) which is guided and secured thereon by means of conical surfaces 34, 36 and cap screws 38, and has a series of sharp longitudinal parallel teeth 40 formed in its periphery, the forward edges of which are preferably radial while the trailing sides extend at an angle of substantially 45° with a radius 42 at the bottom, which is preferably about .047". The spacing between opposing tips of grooves being preferably about 5/8", the circumferential spacing between the adjacent sharp tips of grooves being about 5/16", and the depth of the grooves being about 9/32". This rotor face 32 is preferably made of hardened steel or the like with machined or ground edges on the teeth so that they present a series of sharp hardened cutting edges.

A stator 46, preferably of the same length as the rotor and even therewith, is secured in the lower housing concentric with the rotor and having a series of teeth 48 like those in the rotor but facing inwardly while those of the rotor face outwardly. A radial distance between the teeth of 5/8" forming an annular grinding zone, has been found to be satisfactory with a linear speed of 15,000 to 20,000 feet per minute at the teeth of the rotor. Such teeth on both the rotor and stator are found to be self cleaning and to be satisfactory in pulverizing.

Immediately beneath the rotor is located a disk 50 keyed to the shaft and carrying on its lower face a series of fan blades 52. Beneath this disk and spaced therefrom is a partition 54 secured to the inside of the lower housing 12 and having a central opening 56. Beneath this the housing 12 has a series of openings 60 for the admission of air which passes up through the opening 56. Some of this air passes out through a discharge opening 62 through which heavier particles are blown into a discharge chute 64 from which they may be recovered for reprocessing. Air passing upwardly is controlled by plates 57 slidably mounted on guide strips 58 and adjusted by hand by means of stems 59.

Some of the air from the fan blades 52 passes up through the space between the teeth 40 and 48 and carries with it finer and lighter particles which have been pulverized, this air and these particles passing through openings 70 into the fan space 72 in which rotates a fan 74 preferably having a series of depending blades 76, this fan discharging out through a pipe 78 to any suitable means for separating the particles from the air.

The material to be pulverized is preferably fed through a chute 80 and a screw 82 driven by means of a sprocket 84 and a chain 86 from any suitable source of power such as through a gear reducer 88. The material to be treated is thus preferably fed to the space between the stator and rotor teeth and thence allowed to fall through this space. The gravity is nicely balanced by an upward flow of air through this space so that the material is caused to float between the rotor and stator and is constantly caused to engage the sharp edges of the teeth of both, thereby bringing about a fine cutting and pulverizing of the material.

In Fig. 3 is shown a modified form of rotor 33 in which the teeth 41 are angled forwardly about 5° in the direction of rotation to assist in holding the heavy particles down in the annular grinding zone until such time as they are reduced to smaller size so that they float up on the ascending air currents and are carried out of the machine.

Thus during the pulverizing process, the heavier particles tend to work down through the space between the teeth and finally are blown out through the opening 62 and pass through the chute 64 while the lighter particles slowly pass upward and out through the openings 70 and 78.

From the foregoing it will be apparent that I have provided a very simple and efficient form of pulverizer, particularly for leguminous seeds of the types mentioned, and one which in practice has shown itself to be very efficacious.

The discharge opening 62 may be reduced in area, thereby forcing the material to stay in the pulverizing zone until it is fine enough to float up and be blown out the discharge opening 78.

While I have shown and described but a few embodiments of the invention it will be seen that it is capable of many modifications. Changes, therefore, in the construction and arrangement may be made which do not depart from the spirit and scope of the invention as defined in the appended claims.

I claim as my invention:

1. A high-speed pulverizer of the class described comprising, inner and outer spaced cylindrical units rotatable relatively to each other about a vertical axis, the facing surfaces having deep sharp-edged grooves running generally parallel to the axis of the units, the grooved portions leaning in opposite directions in opposing units, the portions in the movable unit leaning in the direction of its motion, and fan means above and below the rotor and carried by the rotor shaft for forcing a draft of air up between the units to control the downward flow of material being pulverized and to carry lighter particles of that material out of the pulverizer, there being an opening opposite the lower fan through which heavier particles may be blow to remove them from the pulverizer.

2. A high-speed pulverizer comprising an inner cylindrical unit having a vertical axis and having cutting teeth on the outer surface, an outer cylindrical unit concentric with the first unit and having teeth facing the inner surface, the surfaces being close together forming a narrow pulverizing zone between them, said units rotatable at high speed relative to each other, air supply means below the inner unit forcing air up between the surfaces through the pulverizing zone controlling the downward flow of material and carrying the lighter particles up out from between the surfaces, and an opening opposite the air supply and below the pulverizing zone through which the heavier particles are blown to remove them from the pulverizer.

3. A high-speed pulverizer comprising a cylindrical rotor turning at high speed about a vertical axis and having teeth on the surface angled upwardly and forwardly in the direction of rotation to force the particles downward, a cylinder concentric with the rotor and having teeth on the surface facing the teeth of the rotor, the teeth of the two surfaces passing close together forming a narrow pulverizing zone therebetween, an air supply means below the rotor forcing air upward between said surfaces through the pulverizing zone controlling the downward flow of material, an adjustable air control means operably associated with said air supply means to limit the amount of air passing through the pulverizing zone controlling the length of time the material remains in the zone and the fineness to which it is ground, and an opening opposite the air supply and below the pulverizing zone through which heavier particles are blown to remove them from the pulverizer.

GERARD W. ELVERUM.

REFERENCES CITED

The following references are of record in the file of this patent:

UNITED STATES PATENTS

| Number | Name | Date |
|---|---|---|
| 442,086 | Ball | Dec. 2, 1890 |
| 615,811 | Cunningham | Dec. 13, 1898 |
| 1,340,635 | Stenbo | May 18, 1920 |
| 2,294,921 | Lykken | Sept. 8, 1942 |
| 2,358,170 | Krueger | Sept. 12, 1944 |

FOREIGN PATENTS

| Number | Country | Date |
|---|---|---|
| 643,241 | France | May 15, 1928 |
| 62,079 | Germany | Apr. 30, 1892 |
| 8,781 | Great Britain | of 1841 |
| 270,798 | Great Britain | May 11, 1927 |
| 371,352 | Italy | May 20, 1939 |